S. J. McNAUGHTON.
CORN GATHERER.
APPLICATION FILED APR. 30, 1908
910,566.
Patented Jan. 26, 1909.
3 SHEETS—SHEET 2.
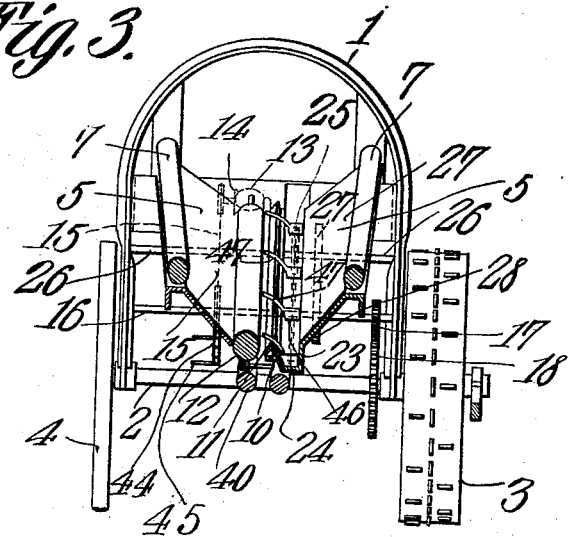
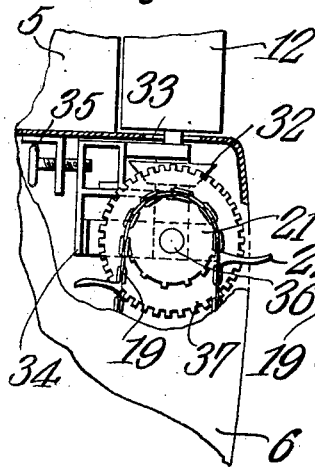
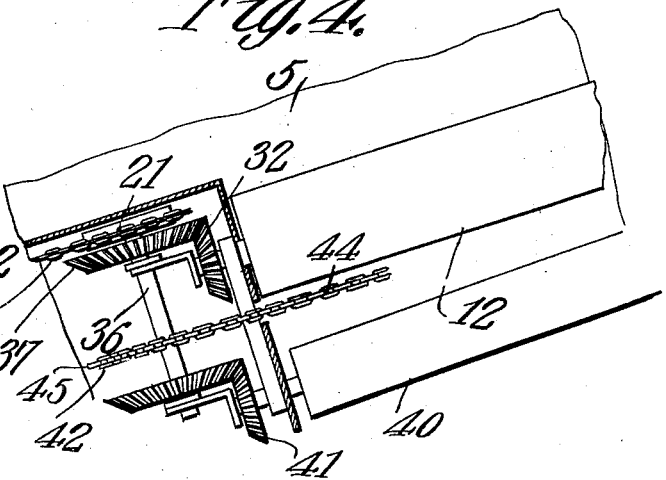
Witnesses
Inventor
Samuel J. McNaughton
By C. A. Snow & Co
Attorneys S. J. McNAUGHTON.
CORN GATHERER.
APPLICATION FILED APR. 30, 1908.
910,566.
Patented Jan. 26, 1909.
3 SHEETS—SHEET 3.
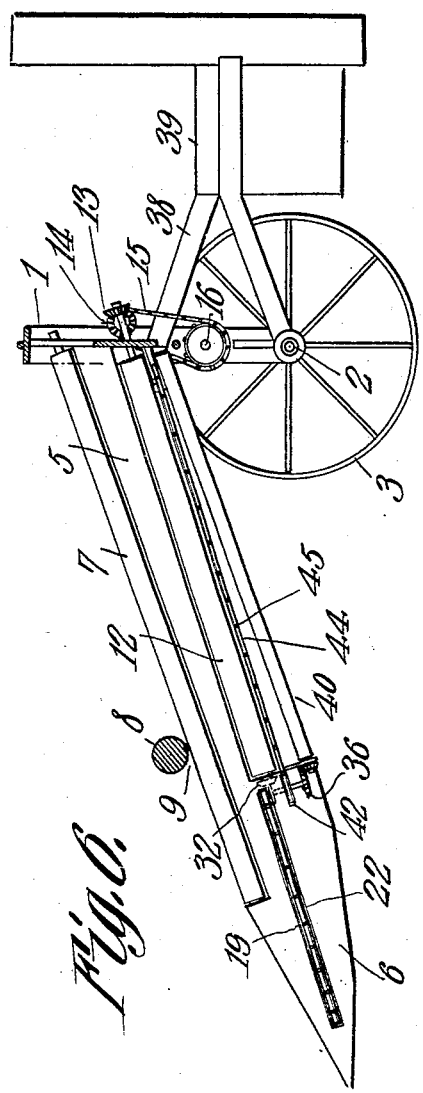
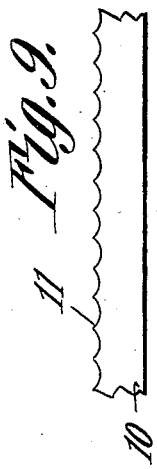
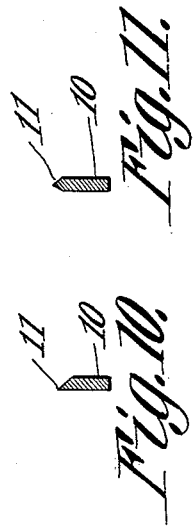
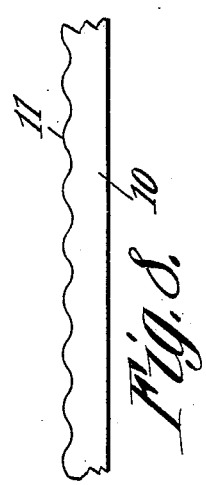
Witnesses
Inventor
Samuel J. McNaughton.
By C. A. Snow & Co
Attorneys

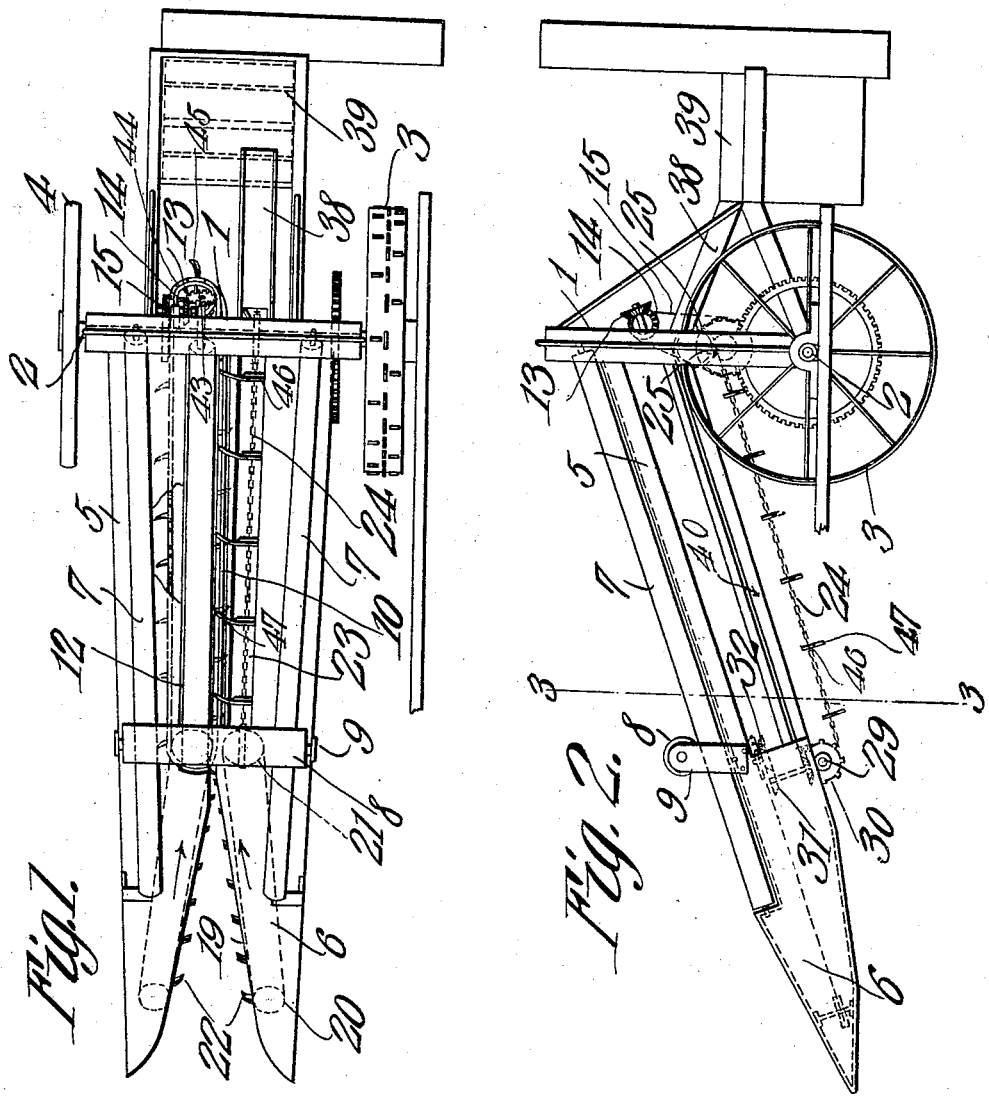

UNITED STATES PATENT OFFICE.

SAMUEL J. McNAUGHTON, OF WESTBORO, MISSOURI.

CORN-GATHERER.

No. 910,566.   Specification of Letters Patent.   Patented Jan. 26, 1909.

Application filed April 30, 1908. Serial No. 430,130.

*To all whom it may concern:*

Be it known that I, SAMUEL J. MCNAUGHTON, a citizen of the United States, residing at Westboro, in the county of Atchison and State of Missouri, have invented a new and useful Corn-Gatherer, of which the following is a specification.

This invention has relation to corn gatherers and it consists in the novel construction and arrangement of its parts as hereinafter shown and described.

The object of the invention is to provide a gatherer which is adapted to remove ears of corn from the stalks as they stand in a row without cutting the stalks.

The parts are so arranged that the ears are forced over the cutting edge of a knife in such manner that as the implement advances along the row the ears are severed at their shanks from the stalk without injury to the ear or removing superfluous parts of the stalks with them.

Heretofore it has been generally the practice to remove the ears from the stalks by pinching but this method is objectionable for the reason that frequently the bases of the ears are caught between the pinching rolls and when this occurs the kernels of grain at the bases of the ears are shelled from the cob and produce waste. Or when the stalks are not of sufficient diameter to effectually fill the intervening space between the pinching rolls it frequently happens that portions of the stalks adhere to the ears and this superfluous material subsequently enters the husking rows and impedes or interferes with the proper operation of the same. It is with a view of overcoming these objectionable features in the process of gathering corn that suggests the present invention.

An additional advantage possessed by the present construction is that the shanks of the ears are forced over the severing blade and are cut with a shearing stroke thereby reducing the draft upon the implement and materially simplifying the construction.

In the accompanying drawings: Figure 1 is a plan view of the gatherer. Fig. 2 is a side elevation of the same. Fig. 3 is a transverse sectional view of the same cut on the line 3, 3 of Fig. 2. Fig. 4 is a side elevation of one end of a roll used for forcing the ears over the blade showing adjacent parts in section. Fig. 5 is a plan view of the same end of said roll showing adjacent parts broken away. Fig. 6 is a longitudinal sectional view of the gatherer, and Figs. 7, 8, 9, 10 and 11 are views showing the various forms that the cutting edge of the blade may have.

The arch frame 1 is mounted upon the axle 2 which in turn is supported by the traction and ground wheels 3 and 4. The said axle preferably rotates with the traction wheel 3. The upper rear ends of the side arms 5 are supported by the arch frame 1. The said arms are spaced apart at their inner longitudinal edges as the usual practice in implements of this character and are forwardly and downwardly inclined. At their forward ends the said arms merge into the finger portions 6, the inner edges or sides of which are disposed at an angle to each other. A roll 7 is loosely journaled above the upper edge of each of the arms 5 and the roll 8 is loosely journaled at its ends in lugs 9 mounted at the outer sides of the arms 5. The said roll 8 extends transversely across the arms 5 and rolls 7 and is located above the said rolls 7 and substantially at the point where the arms 5 merge into the fingers 6. The blade 10 is mounted at the inner edge of one of the arms 5 and is located in an inclined position with its cutting edge 11 uppermost. The roll 12 is journaled for rotation at the inner edge of the other arm 5 and is juxtaposed with relation to the blade 10. The roll 12 derives its movement through the beveled pinions 13 and 14 and the sprocket chain 15 which is actuated by a sprocket wheel mounted upon the counter shaft 16. The said counter shaft is rotated by the gears 17 and 18 one of which is mounted upon the said counter shaft and the other upon the axle 2. The sprocket chains 19 are arranged to move longitudinally with relation to the fingers 6 and pass around the sprocket wheels 20 and 21. The said chains are provided at intervals with fingers 22 and are so arranged that the fingers project beyond the inner sides of the inner walls of the fingers 6 and move from the ends of the fingers 6 toward the arms 5. The trough 23 is located in one of the arms 5 adjacent the blade 10 and the endless conveyer 24 is arranged to move longitudinally along the said trough. The said conveyer derives its movement by passing around the sprocket wheel 25 mounted upon the shaft 26 which derives its movement through the wheel 27 which is in mesh with the wheel 28 mounted upon the shaft 16. The lower end of the conveyer 24 passes around a sprocket wheel which is mounted upon the stub shaft 29. A beveled pinion 30 is also mounted upon the shaft 29 and is operatively connected by means of the chain of bevel pinions 31 with the sprocket wheel 21 of the chain belt operating in the fingers 6 attached to that arm 5 upon which the elevator 24 is mounted. The lower end of the shaft upon which the roll 12 is mounted is provided with a beveled pinion 32 and the shaft of the roll 12 passes through an elongated opening 33 in a shoulder mounted upon the arm 5. The frame 34 is slidably mounted adjacent the opening 33 and may be moved longitudinally with relation to the said opening by means of the thrust screw 35. The said frame 34 is mounted upon the end of the shaft upon which the roll 12 is mounted. The stub shaft 36 is journaled in the frame 34 and is provided with a beveled pinion 37 which meshes with the pinion 32. The sprocket wheel 21 which actuates the sprocket chain 19 in that finger 6 which is mounted upon the arm 5 carrying the roll 12, is also mounted upon the shaft 36 and thus it will be seen that as the roll 12 rotates movement is transmitted to the said chain 19. Furthermore by adjusting the screw 35 the lower end of the roll 12 may be moved laterally with relation to the blade 10 whereby adjustment may be made to adapt the implement to effectually operate upon stalks of great or small diameter.

The rolls 40 are located at opposite sides of the stalk passage between the arms 5 and at the lower sides of the arms 5 one being under the roll 12 and the other under the blade 10. One of the rolls 40 derives movement through the chain of beveled gear wheels 41 which connect the said roll with the shaft 36. The other roll 40 derives movement in a similar manner from the shaft carrying the beveled gear wheel 31. The shaft of one of the rolls 40 is journaled in the frame 34, while the shaft of the other roll 40 is journaled in fixed bearings at the opposite side of the stalk-passage from the first said roll. The rolls 40 are inclined with relation to the surface of the ground but their forward ends are at a greater distance from the blade 10 than their rear ends. The sprocket wheel 42 is mounted upon the shaft 36 and passes at its upper end around an idle sprocket wheel 43. The chain 44 passes around the wheels 42 and 43 and is provided at intervals with the fingers 45 which at the inner run of the chain are adapted to bridge the space between the roll 12 and the blade 10. The chain 44 moves in an orbit lying between the roll 12 and roll 40. The conveyer 24 is provided at intervals with the blocks 46 which operate in the trough 23. Each block is provided with a lug 47 which extends over the upper edge of the blade 10 as the said block to which it is attached moves up along the trough 23.

The blade 10 may have a straight cutting edge which may be beveled as shown in Fig. 10 or V-shaped as shown in Fig. 11. The cutting edge of the said blade may be provided with serrations, as shown in Fig. 7, or be in the form of a compound curve, as shown in Fig. 8, or abruptly scalloped, as shown in Fig. 9. The specific form of blade or its cutting edge is immaterial.

Any suitable means may be provided for moving the implement along the row of stalks and at the end of the trough 23 a chute 38 is mounted for the purpose of conveying the ears of corn to the husking rolls 39 located at the rear of the implement. From the said husking rolls the husked corn may be delivered by any suitable means to the body of a wagon which may move coincident with the implement or the said ears may be deposited in other receptacles.

The operation of the corn gatherer is as follows: As the implement is drawn along a row of stalks the axle 2 is rotated by the traction wheel 3 and from the said axle movement is transmitted as heretofore described to the roll 12, the elevator 24 and the sprocket chains 19. The fingers 22 upon the chains 19 direct the stalk between the arms 5 and the roll 8 bends the stalks down while the roll 12 has a tendency to bend the stalks laterally over the cutting edge of the knife 10. When the base of the ear or the shank thereof engages the upper edge of the knife 10 the said ear is severed from the stalk and falls into the trough 23 and is carried up by the elevator 24 and deposited in the chute 38 from whence it falls upon the husking rolls 39. By providing the rolls 7 at the upper edges of the arms 5 it is impossible for the stalks to whip over the upper edges of the said arms in such manner as to catch the ears against the upper edges of the said arms and detach the same at these places for the said rolls when encountered will turn and will not offer sufficient resistance to sever the ears from the stalks.

The lugs 47 mounted upon the blocks 46 carried by the conveyer 24 extend over the cutting edge of the blade 10 and assist in pushing the ears along the edge of the knife to facilitate severing the same from the stalks. Fingers 45 carried by the chain 44 extend across the opening between the arms of the gatherer and keep the stalks from crowding close together or jamming between the roll 12 and blade 10. The rolls 40 located at the lower sides of the arms 5 operate upon the opposite sides of the stalks and draw the same down through the space between the roll 12 and the blade 10 and prevent the stalks from interfering with the proper operation of the gatherer.

Having described my invention, what I claim as new and desire to secure by Letters Patent is:

1. A corn gatherer comprising spaced arms, means mounted upon the arms for separating the ears from the stalks and rolls loosely journaled at the upper edges of the arms.

2. A corn gatherer comprising spaced arms, means mounted upon the arms for separating the ears from the stalk, and longitudinally disposed rolls loosely journaled at the upper edges of the arms.

3. A corn gatherer comprising spaced arms, means mounted upon the arms for separating the ears from the stalks, longitudinally disposed rolls loosely journaled at the upper edges of the arms and a transversely disposed roll loosely journaled above the longitudinally disposed rolls.

4. A gatherer comprising spaced arms, a roll journaled for rotation upon one arm, a blade mounted upon the other arm opposite said roll, a conveyer mounted adjacent said blade, and lugs carried by the conveyer which extend over the blade.

5. A gatherer comprising spaced arms, a roll journaled for rotation upon one arm, a blade mounted upon the other arm opposite said roll, a chain moving in an orbit below said roll and carrying fingers which extend transversely across the space between said roll and the blade.

In testimony that I claim the foregoing as my own, I have hereto affixed my signature in the presence of two witnesses.

SAMUEL J. McNAUGHTON.

Witnesses:
JOHN A. GERLASH.
A. M. ANDREWS.